United States Patent
Li et al.

(10) Patent No.: US 10,915,252 B2
(45) Date of Patent: Feb. 9, 2021

(54) SYSTEM AND METHOD FOR MANAGING A GROUP OF STORAGE DEVICES USING THEIR WEAR LEVELS AND A TARGET WEARING PROFILE

(71) Applicant: VMware, Inc., Palo Alto, CA (US)

(72) Inventors: Hui Li, Fremont, CA (US); Naga Ullas Vankayala Harinathagupta, Santa Clara, CA (US); Zhengxun Wu, Sunnyvale, CA (US); Jaykrishna Babu, Santa Clara, CA (US); Hong Li, Fremont, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 16/412,245

(22) Filed: May 14, 2019

(65) Prior Publication Data

US 2020/0363961 A1    Nov. 19, 2020

(51) Int. Cl.
*G06F 3/06* (2006.01)

(52) U.S. Cl.
CPC ............ *G06F 3/0616* (2013.01); *G06F 3/067* (2013.01); *G06F 3/0653* (2013.01); *G06F 3/0662* (2013.01)

(58) Field of Classification Search
CPC .... G06F 3/0616; G06F 3/0653; G06F 3/0662; G06F 3/067
See application file for complete search history.

(56) References Cited

U.S. PATENT DOCUMENTS

| | | | | |
|---|---|---|---|---|
| 2013/0339574 | A1* | 12/2013 | Franceschini | G06F 12/0292 711/103 |
| 2014/0281149 | A1* | 9/2014 | Roberts | G06F 12/0292 711/103 |
| 2015/0006816 | A1* | 1/2015 | Gong | G06F 3/0665 711/114 |
| 2016/0188221 | A1* | 6/2016 | Janik | G06F 3/0655 711/103 |
| 2017/0004421 | A1* | 1/2017 | Gatson | H04L 41/5038 |
| 2017/0315753 | A1* | 11/2017 | Blount | G06F 3/0649 |

* cited by examiner

*Primary Examiner* — David Yi
*Assistant Examiner* — Nicholas A. Paperno
(74) *Attorney, Agent, or Firm* — Loza & Loza, LLP

(57) ABSTRACT

A computer-implemented method and computer system for managing a group of storage devices in a storage system utilizes actual wear levels of the storage devices within the group of storage devices to sort the storage devices in an order. One of the storage devices is then selected as a target storage device based on wear level gaps between adjacent sorted storage devices using a target storage device wearing profile so that write operations from software processes are directed exclusively to the target storage device for a predefined period of time to control wear on the group of storage devices.

20 Claims, 7 Drawing Sheets

SYSTEM AND METHOD FOR MANAGING A GROUP OF STORAGE DEVICES USING THEIR WEAR LEVELS AND A TARGET WEARING PROFILE

BACKGROUND

Most modern storage management solutions, such as VMware's vSAN storage solution, use low-cost local storage devices, which are usually hard disk drives (HDDs) and/or solid-state drives (SSDs). In a typical deployment, a large number of such storage devices is used. These local storage devices may vary in quality due to differences in age, model type and vendor. Thus, these storage devices can wear out unexpectedly.

In order to deal with unexpected "worn out" failure of storage devices, some storage management solutions offer features that prevent potential data loss due to storage device failures and also alert users once any storage devices have failed. However, since these features come with inevitable performance overhead, which is compounded with storage capacity reduction due to storage device failures, a storage environment with these features will be in a compromised or even stressed state for an extended period of time when storage devices fail. A prompt replacement of failed storage devices can reduce this undesired state period. However, such service is challenged by the unexpectedness of storage device failures.

BRIEF DESCRIPTION OF THE DRAWINGS

Throughout the description, similar reference numbers may be used to identify similar elements.

DETAILED DESCRIPTION

Figure 1:
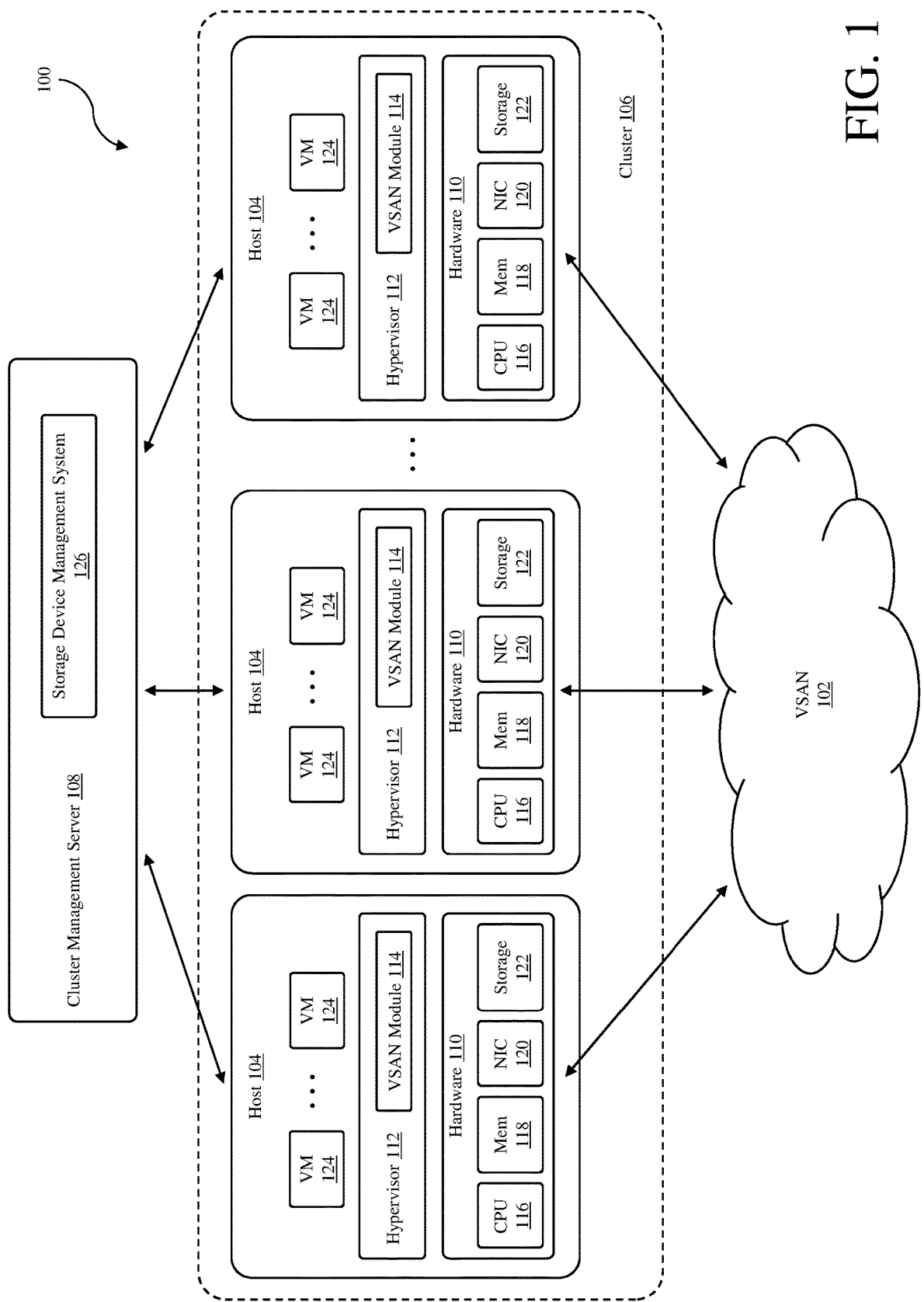
FIG. 1 is a block diagram of a distributed storage system in accordance with an embodiment of the invention.

FIG. 1 illustrates a distributed storage system 100 in accordance with an embodiment of the invention. As shown in FIG. 1, the distributed storage system 100 provides a software-based "virtual storage area network" (VSAN) 102 that leverages local storage resources of host computers 104, which are part of a logically defined cluster 106 of host computers that is managed by a cluster management server 108. The VSAN 102 allows local storage resources of the host computers 104 to be aggregated to form a shared pool of storage resources, which allows the host computers 104, including any software entities or processes running on the host computers, to use the shared storage resources.

The cluster management server 108 operates to manage and monitor the cluster 106 of host computers 104. The cluster management server may be configured to allow an administrator to create the cluster 106, add host computers to the cluster and delete host computers from the cluster. The cluster management server may also be configured to allow an administrator to change settings or parameters of the host computers in the cluster regarding the VSAN 102, which is formed using the local storage resources of the host computers in the cluster. The cluster management server may further be configured to monitor the current configurations of the host computers and any virtual instances running on the host computers, for example, virtual machines (VMs). The monitored configurations may include hardware configuration of each of the host computers and software configurations of each of the host computers. The monitored configurations may also include virtual instance hosting information, i.e., which virtual instances (e.g., VMs) are hosted or running on which host computers. The monitored configurations may also include information regarding the virtual instances running on the different host computers in the cluster.

The cluster management server 108 may also perform operations to manage the virtual instances and the host computers 104 in the cluster 106. As an example, the cluster management server may be configured to perform various resource management operations for the cluster, including virtual instance placement operations for either initial placement of virtual instances and/or load balancing. The process for initial placement of virtual instances, such as VMs, may involve selecting suitable host computers for placement of the virtual instances based on, for example, memory and CPU requirements of the virtual instances, the current memory and CPU loads on all the host computers in the cluster and the memory and CPU capacity of all the host computers in the cluster.

In some embodiments, the cluster management server 108 may be a physical computer. In other embodiments, the cluster management server may be implemented as one or more software programs running on one or more physical computers, such as the host computers 104 in the cluster 106, or running on one or more virtual machines, which may be hosted on any host computers. In an implementation, the cluster management server is a VMware vCenter™ server with at least some of the features available for such a server.

As illustrated in FIG. 1, each host computer 104 in the cluster 106 includes hardware 110, a hypervisor 112, and a VSAN module 114. The hardware 110 of each host computer includes hardware components commonly found in a physical computer system, such as one or more processors 116, one or more system memories 118, one or more network interfaces 120 and one or more local storage devices 122 (collectively referred to herein as "local storage"). Each processor 116 can be any type of a processor, such as a central processing unit (CPU) commonly found in a server. In some embodiments, each processor may be a multi-core processor, and thus, includes multiple independent processing units or cores. Each system memory 118, which may be random access memory (RAM), is the volatile memory of the host computer 104. The network interface 120 is an interface that allows the host computer to communicate with a network, such as the Internet. As an example, the network interface may be a network adapter. Each local storage device 122 is a nonvolatile storage, which may be, for example, a solid-state drive (SSD) or a hard disk drive (HDD).

The hypervisor 112 of each host computer 104, which is a software interface layer that, using virtualization technology, enables sharing of the hardware resources of the host computer by virtual instances 124, such as VMs, running on the host computer. With the support of the hypervisor, the VMs provide isolated execution spaces for guest software.

The VSAN module 114 of each host computer 104 provides access to the local storage resources of that host computer (e.g., handle storage input/output (I/O) operations to data objects stored in the local storage resources as part of the VSAN 102) by other host computers 104 in the cluster 106 or any software entities, such as VMs 124, running on the host computers in the cluster. As an example, the VSAN module of each host computer allows any VM running on any of the host computers in the cluster to access data stored in the local storage resources of that host computer, which may include virtual disks (or portions thereof) of VMs running on any of the host computers and other related files of those VMs. Thus, the VSAN modules of the host computers in the cluster control data that are written on the local storage devices of the host computers.

In the embodiment illustrated in FIG. 1, the cluster management server 108 includes a storage device management system 126 that operates to allow a user to control how of a group of storage devices wears out, which provides predictability of storage device "wear out" failures. Thus, an opportunity can be created for the user to potentially avoid any negative impact due to a sudden storage device loss and minimize maintenance cost associated with replacement of failed storage devices. As explained in detail below, the storage device management system operates on a group of storage devices, which are selected from the storage devices in the storage system 100 by the user, and a target storage device wearing profile for all the storage devices in the group, which is provided by the user. At each predefined period of time or time interval, the storage device management system operates to select one storage device from the group of storage devices based on at least the current wear levels of all the storage devices in the group to direct all storage writes issued from an application layer to that selected storage device for the next time interval so that the resulting wear levels of all storage devices in the group align with the user-specified target storage device wearing profile. This storage device wear management approach is agnostic about the type of storage devices, e.g., SSDs or HHDs, as long as there is a way of obtaining the wear levels of the storage devices.

In an embodiment, the user-provided target storage device wearing profile specifies wear level gaps between two adjacent storage devices with respect to their wear levels when the storage devices within a group of storage devices have been sorted in an order based on their actual current wear levels. In other words, if all the storage devices within the group are sorted in a non-decreasing order based on their individual wear levels, the user-provided target storage device wearing profile is the desired wear level gap to be maintained between any two adjacent storage devices in the group at any given time. The storage device management system uses the user-provided target storage device wearing profile to select an appropriate storage device from the storage device group to direct all storage write operations to that storage device at each iteration to control the wear levels of the storage devices in the group. Thus, the user-provided target storage device wearing profile does not stipulate which specific storage device to wear out first, second etc., but rather controls the wear level gaps between any two storage devices so that there is some predictability about when the next storage devices will fail due to wear once one storage device has failed due to wear. This concept is illustrated in FIG. 2.

Figure 2:
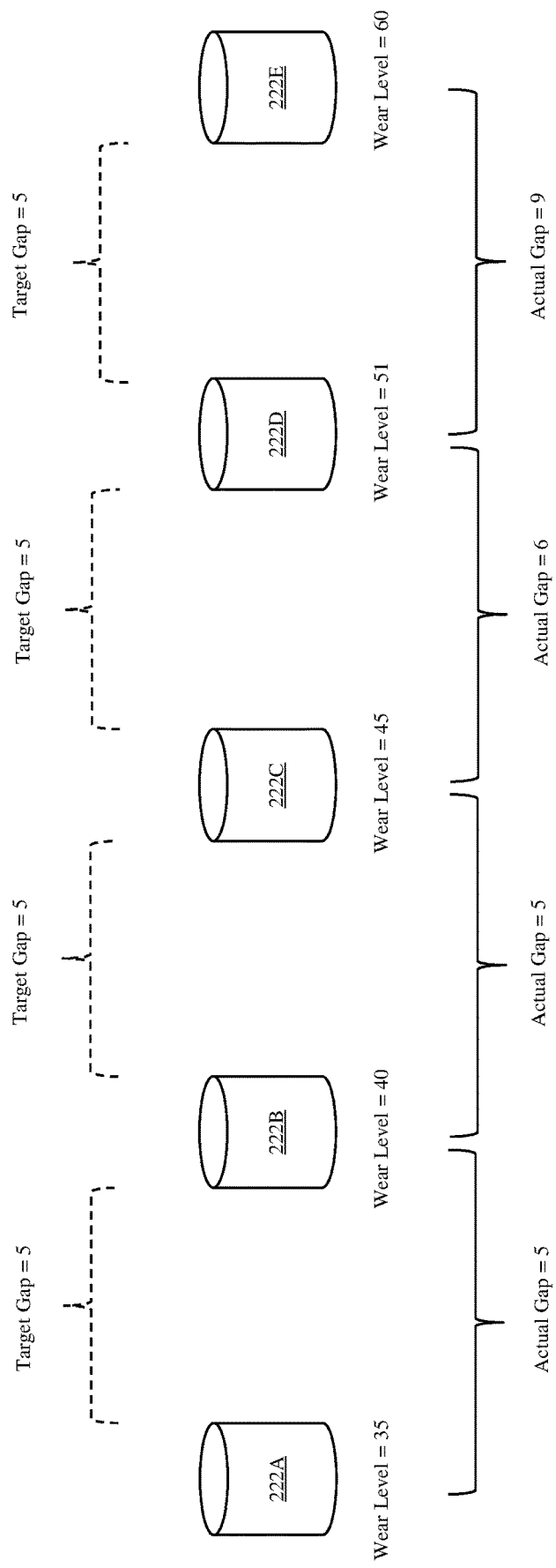
FIG. 2 illustrates a group of storage devices that has been sorted in an order based on actual wear levels in accordance with an embodiment of the invention.

In FIG. 2, a group of five (5) storage devices 222A-222E are shown. These storage devices have been ordered in a non-decreasing order based on their individual wear levels. In this example, the storage devices 222A-222E have wear levels of 35, 40, 45, 51 and 60, where lower numerical values indicate more wear on the storage devices. Let's say that, in this example, the user-provided target storage device wearing profile specifies a target wear level gap of 5 between any two adjacent sorted storage devices, which are pairs of adjacent storage devices in the sorted storage devices. The actual wear level values for the storage devices 222A-222E are 35, 40, 45, 51 and 60. Thus, the actual wear level gap between the adjacent storage device 222A and 222B is 5. Similarly, the actual wear level gap between the adjacent storage devices 222B and 222C is also 5. However, the actual wear level gap between the adjacent storage devices 222C and 222D is 6, and the actual wear level gap between the adjacent storage devices 222D and 222E is 9. Thus, the actual wear level gaps between the adjacent storage devices 222C and 222D and between the adjacent storage devices 222D and 222E exceed the target wear level gap of 5. However, since the actual wear level gap between the adjacent storage devices 222D and 222E is greater than the actual wear level gap between the adjacent storage devices 222D and 222E, the storage device 222E will be selected as the appropriate storage device from this storage device group to direct all application writes to that storage device for the next time period so that the resulting wear level gap between the storage devices 222D and 222E will get closer to the target wear level gap.

The user-provided target storage device wearing profile may be used in one of two modes, which include a linear mode and a step mode. In the linear mode, the user-provided target storage device wearing profile specifies the same wear level gap between any pair of wear-level adjacent storage devices, as illustrated in FIG. 2. In the step mode, the user-provided target storage device wearing profile specifies different wear level gaps between two wear-level adjacent storage devices. Thus, in the step mode, the user can specify a different target wear level gap for each individual pair of wear-level adjacent storage devices. Thus, in the example illustrated in FIG. 2, the user-provided target storage device wearing profile may provide different target wear level gaps between the storage devices 222A and 222B, between the storage devices 222B and 222C, between the storage devices 222C and 222D, and between the storage devices 222D and 222E. These different target wear level gaps may increase from the most worn adjacent storage devices to the least worn adjacent storage devices or vice versa. In some implementations, the user-provided target storage device wearing profile may specify different target wear level gaps for some pairs of adjacent storage devices and same target wear level gaps for other pairs of adjacent storage devices.

The wear level of each storage device in the group may be acquired by the storage device management system 126 by accessing each storage device's self-monitoring analysis and reporting technology (SMART) statistics or indicators, which can be used to determine the wear level. As an example, a media wearout indicator value or the value of power-on hours may be used to determine the wear level of each storage device in the user-defined group. SMART statistics may not be available all the storage devices in the group. If SMART statistics are not available, the wear level of a storage device may be determined using the average write-latency value over a predefined time window, such as four (4) hours.

Figure 3:
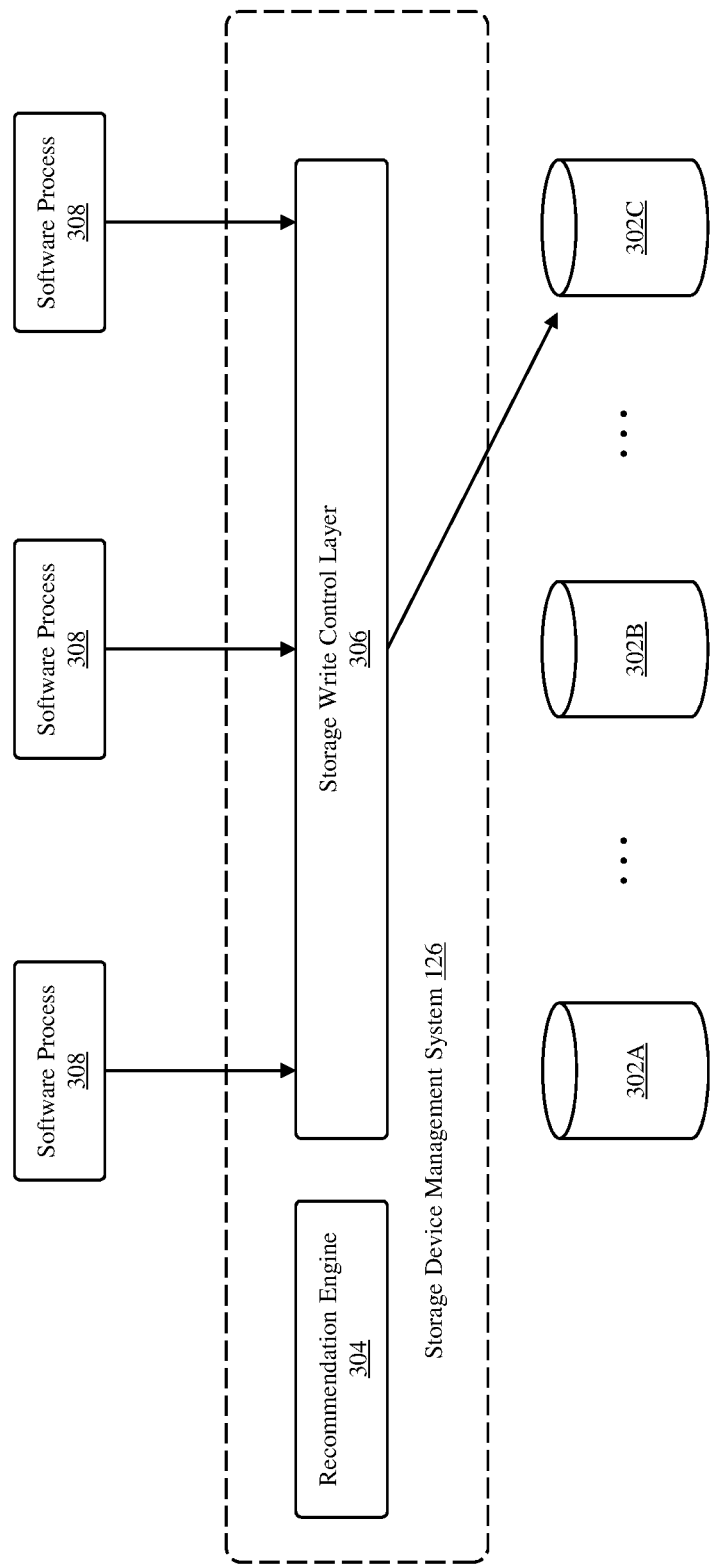
FIG. 3 is a diagram of a storage device management system in accordance with an embodiment of the invention.

Turning now to FIG. 3, the storage device management system 126 operating on a group of storage devices 302, including storage devices 302A, 302B and 302C, in accordance with an embodiment of the invention is shown. The group of storage devices 302 is selected by a user so that the storage device management system can manage the overall wear of these storage devices. The storage devices 302 may be selected from the storage devices 122 of the distributed storage system 100. As shown in FIG. 3, the storage device management system includes a recommendation engine 304 and a storage write control layer 306. The recommendation engine 304 operates to recommend or select one of the storage devices 302 in the group based on a user-provided target storage device wearing profile and the actual wear levels of the storage devices in the group so that write operations from software processes 308 to the group of storage devices 302 are directed to the selected storage device for a predefined period of time. In the illustrated example, the selected storage device is the storage device 302C. As used herein, the software processes 308 can be any software program, applications or software routines that can run on one or more computers, which can be physical computers, such as the host computers 104, or virtual computers, such as the VMs 124. The storage write control layer 306 operates to direct all write operations from the software processes 308 to the selected storage device, as illustrated by the arrow to the storage device 302C.

In an embodiment, the recommendation engine 304 may be implemented as software running in the cluster management server 108, as illustrated in FIG. 1. However, in other embodiments, the recommendation engine may reside in one of the host computers 104 or in any computer system that can communicate with the host computers 104. The storage write control layer 306 may reside in the host computers 104 to control the write operations from the software processes 308, which may be running on the host computers 104. In an embodiment, the storage write control layer is comprised of write control agents (shown in FIG. 4) running on each of the host computers 104. The write control agents may be implemented as software on the host computer 104.

In an embodiment, the recommendation engine 304 may be invoked in a periodic fashion at each predefined time interval, such as a 10-minute interval. At the start of each interval, the recommendation engine will recommend or select one of the storage devices 302 in the group based on the user-provided target storage device wearing profile and the current wear levels of the storage devices in the group. As described in more detail below, the recommendation engine may also use a predicted amount of storage writes for the next interval and a predicted wearing on each storage device in the group for the next interval (if that storage device is selected to handle the write operations for the next interval) to make the storage device selection.

Figure 4:
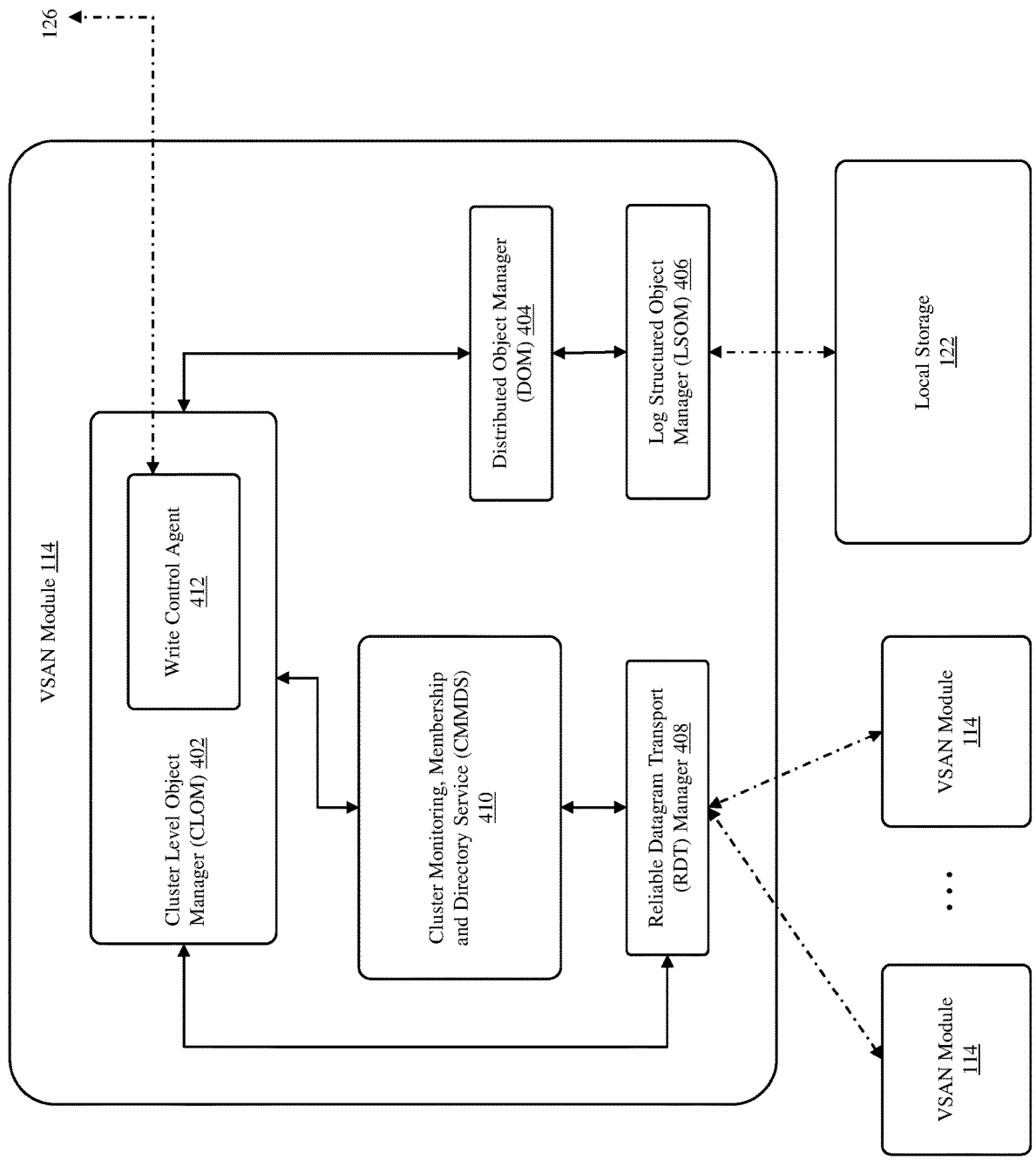
FIG. 4 is a block diagram of a virtual storage array network (VSAN) module in each host computer of the distributed storage system in accordance with an embodiment of the invention.

Turning now to FIG. 4, components of the VSAN module 114, which is included in each host computer 104 in the cluster 106, in accordance with an embodiment of the invention are shown. As shown in FIG. 4, the VSAN module includes a cluster level object manager (CLOM) 402, a distributed object manager (DOM) 404, a local log structured object management (LSOM) 406, a reliable datagram transport (RDT) manager 408, and a cluster monitoring, membership and directory service (CMMDS) 410. These components of the VSAN module may be implemented as software running on each of the host computers in the cluster.

The CLOM 402 operates to validate storage resource availability, and DOM 404 operates to create components and apply configuration locally through the LSOM 406. The DOM also operates to coordinate with counterparts for component creation on other host computers 104 in the cluster 106. All subsequent reads and writes to storage objects funnel through the DOM 404, which will take them to the appropriate components. The LSOM operates to monitor the flow of storage I/O operations to the local storage 122. The RDT manager 408 is the communication mechanism for storage I/Os in a VSAN network, and thus, can communicate with the VSAN modules in other host computers in the cluster. The RDT manager uses transmission control protocol (TCP) at the transport layer and it is responsible for creating and destroying TCP connections (sockets) on demand. The CMMDS 410 is responsible for monitoring the VSAN cluster's membership, checking heartbeats between the host computers in the cluster, and publishing updates to the cluster directory. Other software components use the cluster directory to learn of changes in cluster topology and object configuration. For example, the DOM uses the contents of the cluster directory to determine the host computers in the cluster storing the components of a storage object and the paths by which those host computers are reachable.

In the illustrate embodiment, the VSAN module 114 further comprises a write control agent 412, which is part of the storage write control layer 306 of the storage device management system 126. The write control agent operates to direct all storage write operations from the software process running on the host computer to a selected storage device for each interval, which is determined by the recommendation engine 304 of the storage device management system 126. In operation, the write control agent receives a control signal from the recommendation engine during each interval. The control signal indicates which storage device in the group of storage devices to send all storage write operations from the software process running on the host computer. In response, the write control agent instructs the CLOM 402 to send storage write operations from the software processes running on the host computer to the selected storage device during the next interval. If the selected storage device is the local storage device of the host computer, then the storage write operations are sent to the local storage device during the next interval via the LSOM 406. However, if the selected storage device is the local storage device of another host computer, then the storage write operations are sent to the local storage device of that host computer during the next interval via the RDT manager 408 to the VSAN module of that host computer. Thus, the write control agents in the VSAN modules of the various host computers can direct all the write operations from the software processes running on the various host computers during each interval to a target storage device in the group of storage devices, which is selected by the recommendation engine 304 of the storage device management system 126.

Figures 5A, 5B:
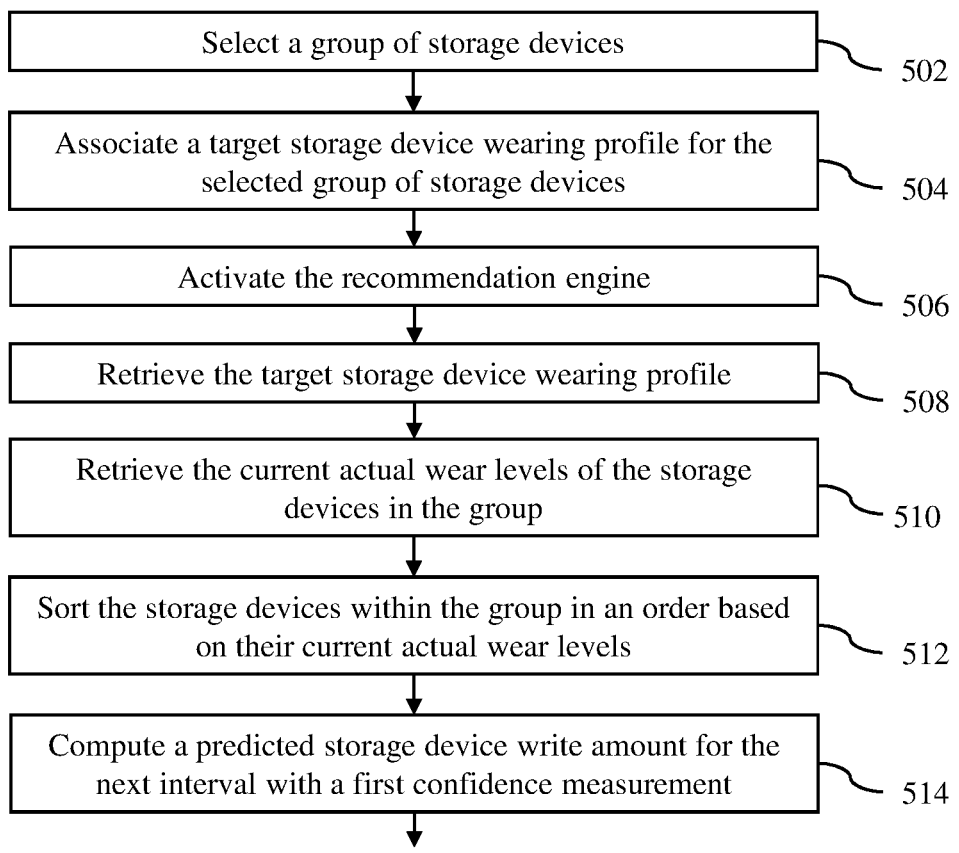
FIGS. 5A and 5B show a process flow diagram of an operation executed by the storage device management system in accordance with an embodiment of the invention.
Figure 5B:
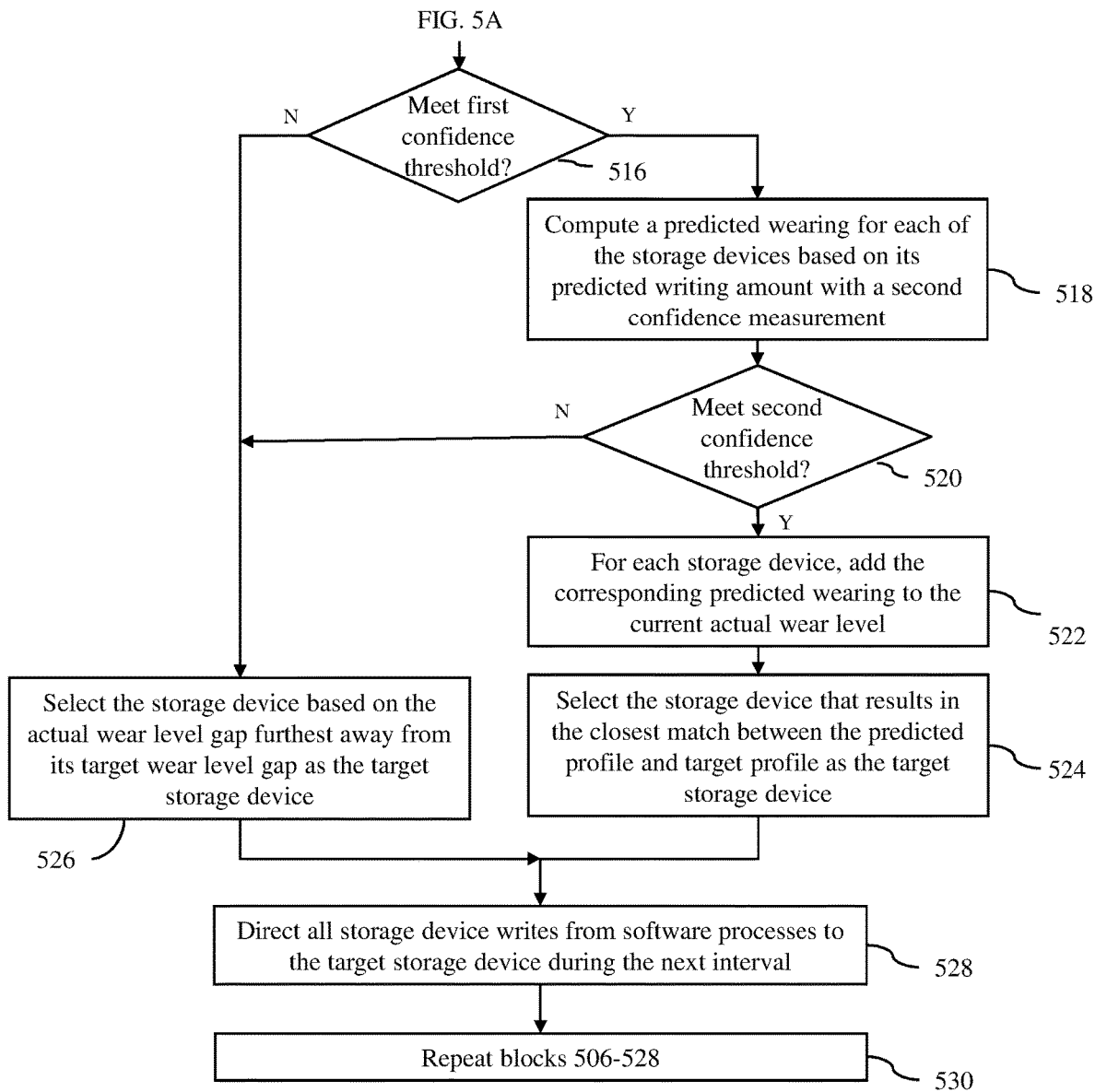

An operation executed by the storage device management system 126 in accordance with an embodiment of the invention is now described with reference to a process flow diagram of FIGS. 5A and 5B and further explained using the block diagram of FIG. 3. At block 502, a group of storage devices is selected as input to the storage device management system so the selected storage devices are managed by the storage device management system. In an embodiment, the storage devices for the group may be selected by a user. As an example, any of the local storage devices 122 in the distributed storage system 100 may be selected by the user to be managed by the storage device management system. Next, at block 504, a target storage device wearing profile is associated for the selected group of storage devices. In an embodiment, the target storage device wearing profile is specified by the user, which may be set in either the linear mode or the step mode. In some embodiments, there may be a default target storage device wearing profile, which can be selected by the user. The target storage device wearing profile may be stored in any storage accessible by the recommendation engine 304.

Next, at block 506, the recommendation engine 304 of the storage device management system 126 is activated. In an embodiment, the recommendation engine 304 is periodically awaken, for example, every 10 minutes, to select one of the storage devices within the group to direct all write operations from the software processes 308 during the next time period or time interval.

Next, at block 508, the target storage device wearing profile is retrieved by the recommendation engine 304. Next, at block 510, the current actual wear levels of the storage devices in the group are retrieved by the recommendation engine 304. In an embodiment, the current actual wear levels are retrieved from the storage devices in the group.

Next, at block 512, the storage devices within the group are sorted in an order based on their current actual wear levels. The storage devices may be sorted in a non-decreasing order or a non-increasing order. Next, at block 514, a predicted storage device write amount for the next interval with a first confidence measurement is computed. The prediction on the next-interval storage device write amount is determined by a random forest regression based on recorded storage device write amounts for all past intervals. In an embodiment, the random forest regression may use an online training process that will incrementally self-train its data model based on all the real data it processed so far. In this case, the data is the storage device write amounts during each interval. The first confidence measurement made by the recommendation engine is based on the mean square error of the current regression model.

Next, at block 516, a determination is made whether the first confidence measurement meets a first confidence threshold, which can be a default setting or a user-defined setting. In an embodiment, the first confidence measurement meets the first confidence threshold if the first confidence measurement is equal to or greater than the first confidence threshold. If the first confidence measurement does not meet the first confidence threshold, the operation proceeds to block 526. However, if the first confidence measurement does meet the first confidence threshold, the operation proceeds to block 518, where a predicted wearing is computed for each of the storage devices in the group based on its predicted write amount for the next interval with a second confidence measurement. The prediction on the predicted wearing for each storage device is also determined using a random forest regression. In an embodiment, this random forest regression may also use an online training process that will incrementally self-train its data model based on all the real data it processed so far. In this case, the data is the correlation between storage device write amount and the storage device wearing amount for each type of storage devices in terms of their vendors and models.

Next, at block 520, a determination is made whether the second confidence measurement meets a second confidence threshold, which can be a default setting or a user-defined setting. In an embodiment, the second confidence measurement meets the second confidence threshold if the second confidence measurement is equal to or greater than the second confidence threshold. If the second confidence measurement does not meet the second confidence threshold, the operation proceeds to block 526. However, if the second confidence measurement does meet the second confidence threshold, the operation proceeds to block 522, where for each storage device in the group, the corresponding predicted wearing is added to the current actual wear level of that storage device to determine how close the predicted storage device wearing profile matches the target storage device wearing profile. That is, for each storage device in the group, the corresponding predicted wearing amount is added to the current actual wear level of that storage device, and then the storage devices in the group are sorted in order, which can be a non-decreasing order or a non-increasing order, based on their actual current wear levels, except for the storage device on which the predicted wearing amount has been added. The wear level for that storage device will be the current actual wear level of the storage device plus the predicted wearing amount. Based on the sorted storage devices, the wear level gaps between adjacent storage devices are computed, which will result in a predicted storage device wearing profile. This predicted storage device wearing profile will then be compared to the target storage device wearing profile to determine how close the two profiles match.

Next, at block 524, the storage device that results in the closest match between the predicted profile and target profile is selected as the target storage device for the next interval by the recommendation engine 304.

If the first confidence measurement or the second confidence measurement does not meet the respective threshold, the operation proceeds to block 526, where the less worn storage device of a pair of adjacent sorted storage devices with the actual wear level gap furthest away from its target wear level gap is selected as the target storage device for the next interval by the recommendation engine 304.

Next, at block 528, all storage device writes from software processes associated with the storage devices in the group, such as the software processes 308 shown in FIG. 3, are directed to the target storage device during the next interval by the storage write control layer 306 of the storage device management system 126. Next, at block 530, blocks 506-528 are repeated for the following interval.

In this fashion, for each interval, all storage device writes are directed to a target storage device so that the actual wear level profile of the storage device in the group gets closer to the target wear level profile.

Figure 6:
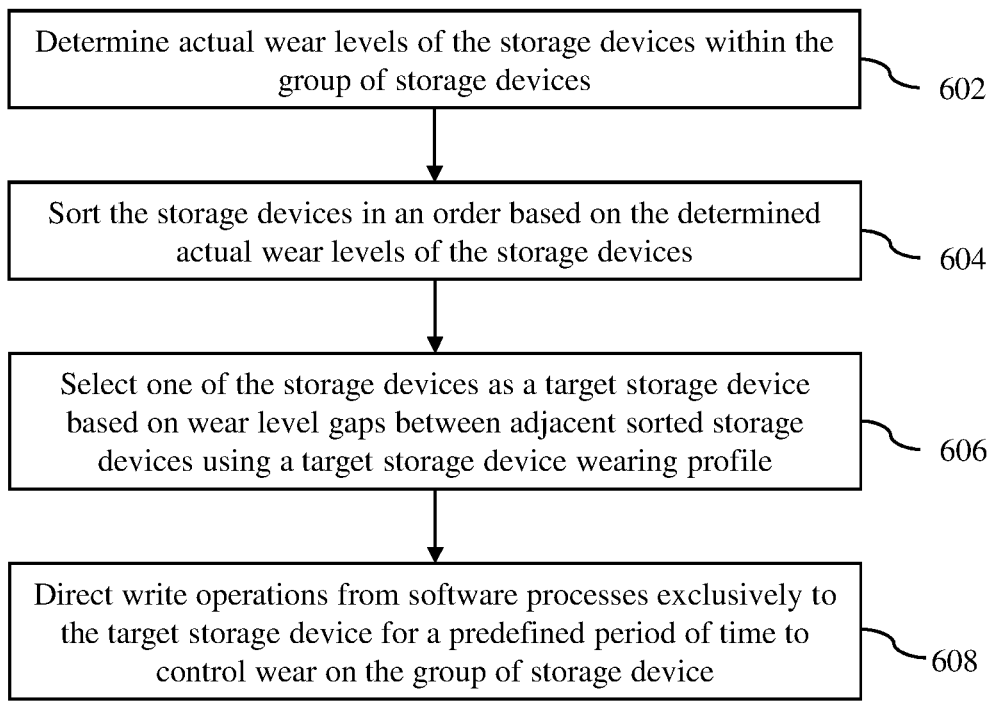
FIG. 6 is a flow diagram of a method of managing a group of storage devices in a storage system in accordance with an embodiment of the invention.

A computer-implemented method for managing a group of storage devices in a storage system in accordance with an embodiment of the invention is described with reference to a flow diagram of FIG. 6. At block 602, actual wear levels of the storage devices within the group of storage devices are determined. At block 604, the storage devices are sorted in an order based on the determined actual wear levels of the storage devices. At block 606, one of the storage devices is selected as a target storage device based on wear level gaps between adjacent sorted storage devices using a target storage device wearing profile. At block 608, write operations from software processes are directed exclusively to the selected storage device within the group of storage devices for a predefined period of time to control wear on the group of storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, non-volatile memory, NVMe device, persistent memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for managing a group of storage devices in a storage system, the method comprising:

determining actual wear levels of the storage devices within the group of storage devices;

sorting the storage devices in an order based on the determined actual wear levels of the storage devices;

selecting one of the storage devices as a target storage device based on wear level gaps between adjacent sorted storage devices using a target storage device wearing profile, wherein each of the wear level gaps is a difference of the determined actual wear levels of two adjacent sorted storage devices and wherein the target storage device wearing profile specifies desired wear level gaps between the adjacent sorted storage devices; and directing write operations from software processes exclusively to the target storage device for a predefined period of time to control wear on the group of storage devices.

2. The method of claim 1, wherein determining the actual wear levels of the storage devices within the group of storage devices includes accessing self-monitoring analysis and reporting technology (SMART) statistics from the storage devices.

3. The method of claim 1, wherein determining the actual wear levels of the storage devices within the group of storage devices includes computing an average write-latency value over a predefined time window for at least one of the storage devices.

4. The method of claim 1, wherein the order based on the determined actual wear levels of the storage devices is a non-decreasing order based on the determined actual wear levels of the storage devices.

5. The method of claim 1, wherein selecting one of the storage devices as the target storage device includes using a predicted storage device write amount for a next interval and a predicted wearing for each of the storage devices in the group due to the predicted storage device write amount for the next interval to select the target storage device.

6. The method of claim 5, further comprising, for each storage device in the group, adding the corresponding predicted wearing to the current actual wear level of that storage device and sorting the storage devices in order based on their actual current wear levels, except for the storage device on which the corresponding predicted wearing has been added, to compare a predicted storage device wearing profile to the target storage device wearing profile.

7. The method of claim 5, wherein using the predicted storage device write amount for the next interval and the predicted wearing for each of the storage devices in the group due to the predicted storage device write amount for the next interval to select the target storage device includes computing a confidence measurement for at least one of the predicted storage device write amount and the predicted wearing for any of the storage devices.

8. The method of claim 7, further comprising, when the confidence measurement does not meet a confidence threshold, selecting a less worn storage device from a pair of adjacent sorted storage devices with an actual wear level gap furthest away from a corresponding target wear level gap as specified in the target storage device wearing profile.

9. A non-transitory computer-readable storage medium containing program instructions for managing a group of storage devices in a storage system, wherein execution of the program instructions by one or more processors of a computer system causes the one or more processors to perform steps comprising:
   determining actual wear levels of the storage devices within the group of storage devices;
   sorting the storage devices in an order based on the determined actual wear levels of the storage devices;
   selecting one of the storage devices as a target storage device based on wear level gaps between adjacent sorted storage devices using a target storage device wearing profile, wherein each of the wear level gaps is a difference of the determined actual wear levels of two adjacent sorted storage devices and wherein the target storage device wearing profile specifies desired wear level gaps between the adjacent sorted storage devices; and
   directing write operations from software processes exclusively to the target storage device for a predefined period of time to control wear on the group of storage devices.

10. The non-transitory computer-readable storage medium of claim 9, wherein determining the actual wear levels of the storage devices within the group of storage devices includes accessing self-monitoring analysis and reporting technology (SMART) statistics from the storage devices.

11. The non-transitory computer-readable storage medium of claim 9, wherein determining the actual wear levels of the storage devices within the group of storage devices includes computing an average write-latency value over a predefined time window for at least one of the storage devices.

12. The non-transitory computer-readable storage medium of claim 9, wherein the order based on the determined actual wear levels of the storage devices is a non-decreasing order based on the determined actual wear levels of the storage devices.

13. The non-transitory computer-readable storage medium of claim 9, wherein selecting one of the storage devices as the target storage device includes using a predicted storage device write amount for a next interval and a predicted wearing for each of the storage devices in the group due to the predicted storage device write amount for the next interval to select the target storage device.

14. The non-transitory computer-readable storage medium of claim 13, wherein the steps further comprise, for each storage device in the group, adding the corresponding predicted wearing to the current actual wear level of that storage device and sorting the storage devices in order based on their actual current wear levels, except for the storage device on which the corresponding predicted wearing has been added, to compare a predicted storage device wearing profile to the target storage device wearing profile.

15. The non-transitory computer-readable storage medium of claim 13, wherein using the predicted storage device write amount for the next interval and the predicted wearing for each of the storage devices in the group due to the predicted storage device write amount for the next interval to select the target storage device includes computing a confidence measurement for at least one of the predicted storage device write amount and the predicted wearing for any of the storage devices.

16. The non-transitory computer-readable storage medium of claim 15, wherein the steps further comprise, when the confidence measurement does not meet a confidence threshold, selecting a less worn storage device from a pair of adjacent sorted storage devices with an actual wear level gap furthest away from a corresponding target wear level gap as specified in the target storage device wearing profile.

17. A computer system comprising:
   memory; and
   one or more processors configured to:
      determine actual wear levels of storage devices within a group of storage devices;
      sort the storage devices in an order based on the determined actual wear levels of the storage devices;
      select one of the storage devices as a target storage device based on wear level gaps between adjacent sorted storage devices using a target storage device wearing profile, wherein each of the wear level gaps is a difference of the determined actual wear levels of two adjacent sorted storage devices and wherein the target storage device wearing profile specifies desired wear level gaps between the adjacent sorted storage devices; and
      direct write operations from software processes exclusively to the target storage device for a predefined period of time to control wear on the group of storage devices.

18. The computer system of claim 17, wherein the one or more processors are configured to access self-monitoring analysis and reporting technology (SMART) statistics from the storage devices to determine the actual wear levels of the storage devices within the group of storage devices.

19. The computer system of claim 17, wherein the one or more processors are configured to compute an average write-latency value over a predefined time window for each of the storage devices to determine the actual wear levels of the storage devices within the group of storage devices.

20. The computer system of claim 17, wherein the order based on the determined actual wear levels of the storage devices is a non-decreasing order based on the determined actual wear levels of the storage devices.

* * * * *